No. 731,601. PATENTED JUNE 23, 1903.
T. McPHERSON.
COTTON CHOPPER AND PLOW.
APPLICATION FILED NOV. 7, 1902.
NO MODEL. 2 SHEETS—SHEET 1.
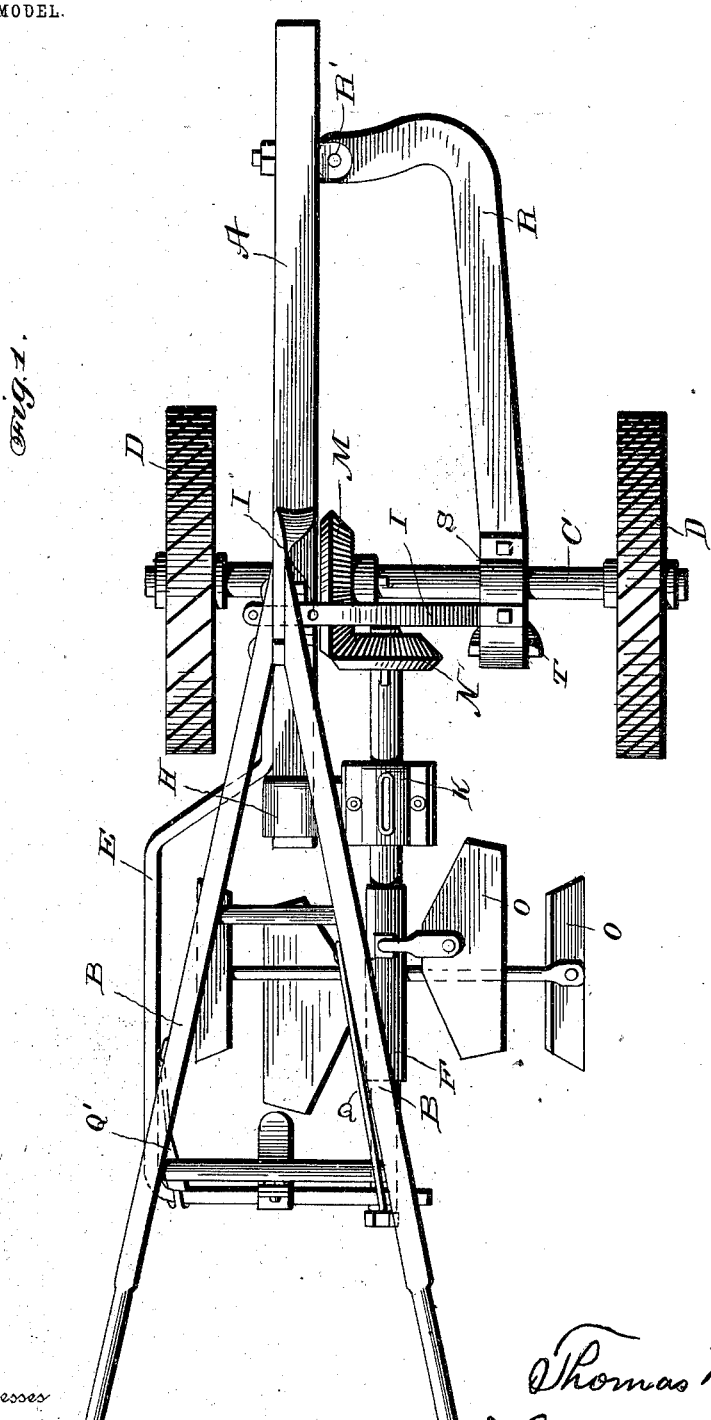
Witnesses
R. A. Boswell.
Inventor
Thomas McPherson
By Franklin N. Hough
Attorney No. 731,601. PATENTED JUNE 23, 1903.
T. McPHERSON.
COTTON CHOPPER AND PLOW.
APPLICATION FILED NOV. 7, 1902.
NO MODEL. 2 SHEETS—SHEET 2.
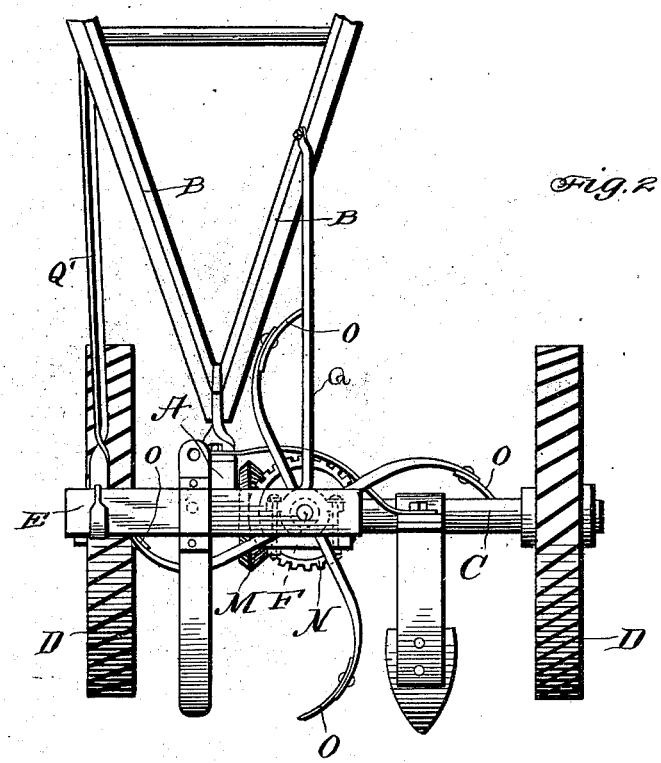
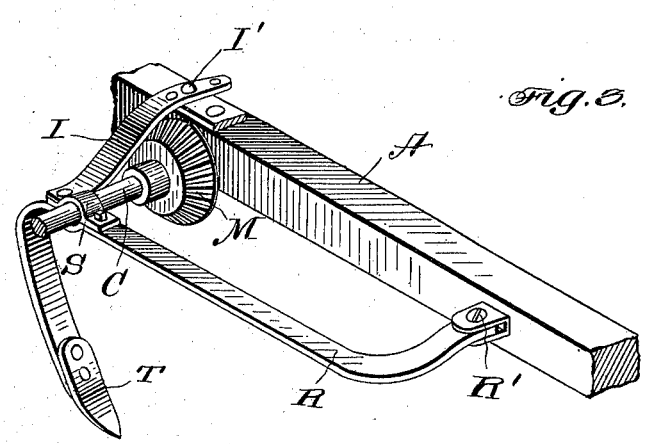

No. 731,601. Patented June 23, 1903.

UNITED STATES PATENT OFFICE.

THOMAS McPHERSON, OF McBEE, SOUTH CAROLINA.

COTTON-CHOPPER AND PLOW.

SPECIFICATION forming part of Letters Patent No. 731,601, dated June 23, 1903.

Application filed November 7, 1902. Serial No. 130,468. (No model.)

*To all whom it may concern:*

Be it known that I, THOMAS MCPHERSON, a citizen of the United States, residing at Mc-Bee, in the county of Chesterfield and State of South Carolina, have invented certain new and useful Improvements in Cotton-Choppers and Plows; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in cotton-choppers and plows; and it consists in the provision of a rotary shaft having cotton-chopping knives adapted to rotate therewith and also in the provision of an adjustable pivoted arm carrying the plow and adapted to be adjusted and held in different locations upon the main operating-shaft.

The invention consists, further, in various details of construction and combinations of parts, which will be hereinafter fully described and then specifically defined in the appended claims.

My invention is clearly illustrated in the accompanying drawings, which, with the letters of reference marked thereon, form a part of this application, and in which drawings similar letters of reference indicate like parts in the views, in which—

Figure 1 is a top plan view of my improved cotton-chopper and plow, and Fig. 2 is a rear elevation, and Fig. 3 is a detail view showing the adjusting means whereby the plow may be held in different positions.

Reference now being had to the details of the drawings by letter, A designates the beam of the machine, having suitable handles B, which are securely bolted to the frame, and C designates a shaft which is journaled in the beam A, and driving-wheels D are mounted on and adapted to rotate with said shaft. A bracket extension E, made, preferably, of strong substantial metal, is fastened to the side of the beam and is bent in the shape illustrated in Fig. 1 and adapted to form a bearing for one end of a shaft F, which carries the chopping-knives. The other end of said shaft is supported by means of a hanger H, of substantially inverted-L shape, which catches over the beam. Said hanger carries a bearing-box K. To the forward end of the shaft F is keyed a beveled gear-wheel N, which is in mesh with a similar wheel M, keyed to rotate with the shaft C. Radiating out from the hub portion of the chopper are the knives O, which may be of any shape or held with their cutting edges at any inclination desired which may be found best adapted for the purpose for which the device is intended. Said bracket extension E is supported at its rear end by means of braces Q and Q', which are fastened to the handles in any suitable manner.

The adjustable plow attachment comprises the pivoted arm R, pivoted at R' on a pin carried by an eyebolt passing through the beam and has a journal-boxing S, mounted upon the shaft C, and secured to the free end of said arm is a plow T. An adjusting-arm I is secured to the arm R adjacent to its free end and is provided with a series of apertures through which a bolt I' may be passed in order to hold said arm I at different locations upon the beam A, accordingly as it may be desired to hold the plow near to or farther from the beam.

By having the plow-carrying arm R pivotally connected to the eyebolt at R' and provided with the box S, mounted on the shaft, the plow may be easily shifted toward or away from the plow-beam and held in an adjusted position by means of the bar I, which serves as a handle to swing the arm and which is adapted for attachment to the plow-beam in the manner illustrated. By this means for adjustment the plow may be readily adjusted to operate in different positions with relation to the rotary cotton-chopper.

From the foregoing it will be observed that by the provision of a cotton-chopper and plow embodying the features illustrated and as herein described an efficient agricultural implement is provided which will enable a person to thoroughly chop cotton and to plow the soil by the provision of the adjustable plow.

While I have shown a construction embodying the essential features of my invention, it will be understood that I may make alterations in the detailed construction of the device without departing from the spirit of the invention.

Having thus fully described my invention, what I claim as new, and desire to secure by Letters Patent, is—

1. In combination with the beam and axle mounted thereon, an adjustable arm pivotally connected at one end to said beam, a bearing-box carried by said arm and in which the axle has a bearing, and a plow carried at one end of said arm, as set forth.

2. In combination with the beam of a cotton-chopper, an arm pivoted at one end thereto, its other end downwardly bent and carrying a plow, an axle supporting said beam, a bearing-box through which said axle passes, a bar fastened at one end to the bearing-box and its other end adjustably held to the beam, as set forth.

In testimony whereof I hereunto affix my signature in presence of two witnesses.

THOMAS McPHERSON.

Witnesses:
 B. W. HEATH,
 L. D. ROBERTSON.